G. E. SCHUELE.
CAMERA SHUTTER.
APPLICATION FILED MAR. 13, 1909.
996,888.
Patented July 4, 1911.
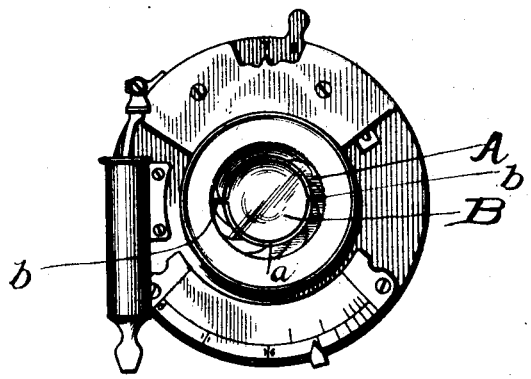
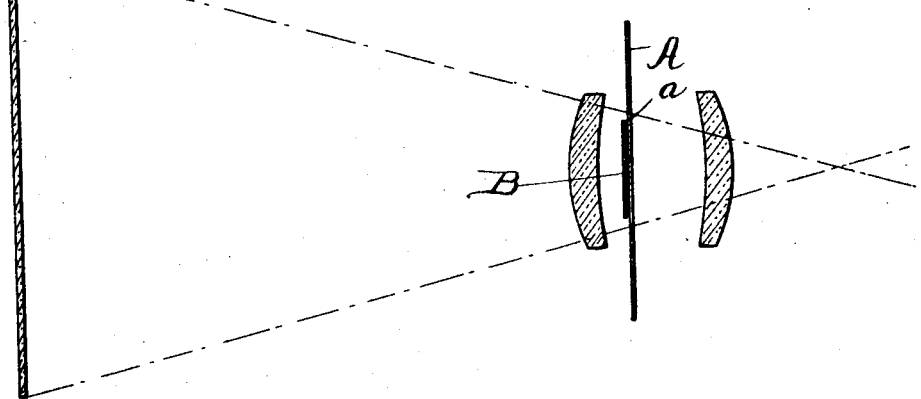
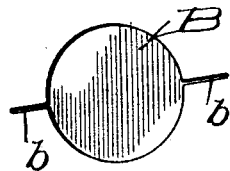
WITNESSES
INVENTOR
George E. Schuele,
ATTORNEYS

UNITED STATES PATENT OFFICE.

GEORGE E. SCHUELE, OF VANCOUVER, WASHINGTON.

CAMERA-SHUTTER.

996,888.   Specification of Letters Patent.   Patented July 4, 1911.

Application filed March 13, 1909. Serial No. 483,305.

*To all whom it may concern:*

Be it known that I, GEORGE E. SCHUELE, a citizen of the United States, residing at Vancouver, in the county of Clarke and State of Washington, have invented certain new and useful Improvements in Camera-Shutters; and I do hereby declare the following to be a full, clear, and exact description of the invention, such as will enable others skilled in the art to which it appertains to make and use the same.

It is a principle well recognized in the use and manipulation of cameras that the finer the aperture in the shutter, the more distinct will be the image on the plate or film, as the case may be. But, as the aperture is decreased in diameter, so, necessarily, is the amount of light entering decreased, thus, consequently, necessitating a longer exposure, whereby, on dark days, snap-shots are practically impossible.

It is the object, therefore, of my invention, to provide a shutter of such peculiar construction that, with the use thereof, as fine an image as possible may be obtained, at the same time permitting a sufficient amount of light to enter. With the use of my device, therefore, it is possible to take snap-shots on very dark days, and the operator does not have to wait for a bright sun to illuminate the object to be photographed. With this end in view, therefore, my idea is to use, in connection with the ordinary movable shutter, a stationary, removable, imperforate shutter-disk or plate, whereby the light-rays are admitted not through said disk, but around the circumference thereof, between said circumference and the inner edge of the movable shutter; and it is obvious that the width of the opening between said movable shutter and said disk may be varied by manipulation of the movable shutter, in the ordinary manner.

With the above object in view, the invention resides in the novel construction, combination, and arrangement of parts as hereinafter fully appearing in the specification, and as summed up in the claim and illustrated in the drawing, in which latter:

Figure 1 is a front elevation of a camera equipped with my invention; Fig. 2 is a diagrammatic view; and Fig. 3 is a detached detail view of the shutter-disk.

Referring, now, in detail to the drawing: A designates the outer movable shutter, which may be of the ordinary and well known construction, and hence needs no explanation.

The essence of my invention resides in the provision of a shutter-disk B, which is stationary with reference to the movable shutter A and is, also, imperforate. The disk may be removed at will, and is provided with suitable means for support thereof in the camera, as by ribs $b$, $b$ resting against any appropriate portion of the camera. This shutter-disk is disposed in juxtaposition to the movable shutter A, as shown, so that the light-rays are admitted around the circumference of the disk, that is, between the disk and the shutter; the width of the opening $a$ being increased or diminished by manipulation of the shutter A, in the well known manner. The ribs $b$, extending across the opening $a$, in no wise affects the distinctness of the picture, in the operation of the device.

As the principle is recognized in the use of cameras, that the finer the aperture in the shutter, the more distinct will be the image on the plate or film, as the case may be, in shutters, as used at the present time, the aperture at the center of the shutter is very small, which, while giving a fine image, does not allow much light to enter. Now, in my device, for the same width of opening as that of the central aperture of an ordinary camera-shutter, I obtain the same distinctness of image and, at the same time, the admission of a vastly greater amount of light, thus necessitating diminishing the width of the opening and thereby obtaining a still clearer image.

From the above description, taken in connection with the drawing, the salient and important advantages of my invention will be apparent, especially to those skilled in the art to which my invention appertains.

Having thus fully described my invention, what I claim as new and desire to secure by Letters-Patent is:

In a camera having a diaphragm provided with a diaphragm-opening, a shutter-casing, an imperforate disk positioned to cut off the admission of light through said opening, except around the circumference of said disk, and ribs carried by said disk, and bearing against said shutter-casing, for supporting the same.

In testimony whereof, I affix my signature, in the presence of two subscribing witnesses.

GEORGE E. SCHUELE.

Witnesses:
CHAS. H. SCHUELE,
W. E. YATES.

Copies of this patent may be obtained for five cents each, by addressing the "Commissioner of Patents, Washington, D. C."